US011866993B2

(12) United States Patent
Lin

(10) Patent No.: US 11,866,993 B2
(45) Date of Patent: Jan. 9, 2024

(54) ROLLER SHADE HEM BAR ASSEMBLY

(71) Applicant: Crestron Electronics, Inc., Rockleigh, NJ (US)

(72) Inventor: Fang Lin, Staten Island, NY (US)

(73) Assignee: Crestron Electronics, Inc., Rockleigh, NJ (US)

( * ) Notice: Subject to any disclaimer, the term of this patent is extended or adjusted under 35 U.S.C. 154(b) by 77 days.

(21) Appl. No.: 17/829,656

(22) Filed: Jun. 1, 2022

(65) Prior Publication Data

US 2023/0392439 A1 Dec. 7, 2023

(51) Int. Cl.
*E06B 9/42* (2006.01)
*E06B 9/62* (2006.01)

(52) U.S. Cl.
CPC . *E06B 9/42* (2013.01); *E06B 9/62* (2013.01)

(58) Field of Classification Search
CPC ................. E06B 9/42; E06B 9/46; E06B 9/62
See application file for complete search history.

(56) References Cited

U.S. PATENT DOCUMENTS

| | | | |
|---|---|---|---|
| 638,969 | A | 12/1899 | Kincaid |
| 1,233,314 | A | 7/1917 | Costello |
| 1,780,556 | A | 3/1929 | Kallin et al. |
| 1,782,905 | A | 12/1929 | Mohun et al. |
| 1,749,223 | A | 3/1930 | Mott |
| 1,909,109 | A | 1/1932 | Kopfstein |
| 2,361,785 | A | 9/1943 | Mohun |
| 2,466,648 | A | 7/1944 | Thexton |
| 2,784,781 | A | 6/1953 | Rhoades |
| 3,524,491 | A | 8/1970 | Olson |
| 3,724,524 | A | 4/1973 | Potter |
| 3,879,806 | A | 4/1975 | Armstrong |
| 3,960,197 | A | 6/1976 | Daniels |
| 4,189,880 | A | 2/1980 | Ballin |
| 4,234,035 | A | 11/1980 | Babbs |
| 4,333,284 | A | 6/1982 | Meadows |
| 4,344,474 | A | 8/1982 | Berman |
| 4,393,915 | A | 7/1983 | Olson |
| 4,452,294 | A | 6/1984 | Fukuchi |
| 4,610,292 | A | 9/1986 | Hausmann et al. |
| 4,665,670 | A | 5/1987 | van den Burg |

(Continued)

OTHER PUBLICATIONS

U.S. Appl. No. 17/347,856, filed Jun. 15, 2021 by Crestron Electronics, Inc., titled Roller Shade Hem Bar Assembly.

*Primary Examiner* — Beth A Stephan
(74) *Attorney, Agent, or Firm* — Crestron Electronics, Inc.

(57) ABSTRACT

A hem bar assembly that secures to a shade material of a roller shade comprising first and second hem bar portions each including an inner face having a first channel, a second channel, and third channel located between the first and second channels. The hem bar assembly further comprises at least one tubular spline that wedges and retains the shade material within one of the first channel and the second channel of one of the first and second hem bar portions. The hem bar assembly further comprises a longitudinal retaining clip having at least a pair of oppositely disposed hooked arms outwardly extending therefrom, wherein each hooked arm is adapted to enter and clip to one of the third channels in a respective first and second hem bar portions to attach the first hem bar portion to the second hem bar portion.

19 Claims, 8 Drawing Sheets

(56) References Cited

U.S. PATENT DOCUMENTS

| | | | | |
|---|---|---|---|---|
| 4,690,192 | A | 9/1987 | Stilling | |
| 5,320,154 | A | 6/1994 | Colson et al. | |
| 5,671,795 | A | 1/1997 | Keil | |
| 5,819,836 | A | 10/1998 | Keil | |
| 5,862,851 | A | 1/1999 | Stoebich et al. | |
| 6,032,433 | A | 3/2000 | Hatziathanasiou | |
| 6,167,939 | B1 | 1/2001 | Barone | |
| 6,412,538 | B1 | 7/2002 | Welfonder | |
| 6,598,651 | B2 | 7/2003 | Ehrenberger et al. | |
| 6,845,806 | B2 | 1/2005 | Bottschall et al. | |
| 6,978,821 | B2 | 12/2005 | Welfonder | |
| D633,742 | S | 3/2011 | Ng | |
| D639,098 | S | 6/2011 | Bosgoed | |
| 8,016,013 | B2 | 9/2011 | Horvath | |
| 8,028,381 | B2 | 10/2011 | Murray | |
| 8,291,962 | B2 | 10/2012 | Allsopp et al. | |
| D670,946 | S | 11/2012 | Ng | |
| D692,685 | S | 11/2013 | Chou | |
| D843,131 | S | 3/2019 | Chou | |
| D858,139 | S | 3/2019 | Holt et al. | |
| 10,577,860 | B2 | 3/2020 | Seuberling et al. | |
| 11,215,008 | B2 | 1/2022 | Blair et al. | |
| 11,499,368 | B1 * | 11/2022 | Menendez | E06B 9/42 |
| 11,725,455 | B2 * | 8/2023 | Menendez | E06B 9/42<br>160/290.1 |
| 2008/0000056 | A1 | 1/2008 | Murray | |
| 2008/0035281 | A1 | 2/2008 | Kirby | |
| 2011/0049071 | A1 | 3/2011 | Hart et al. | |
| 2012/0061034 | A1 | 3/2012 | Ng | |
| 2012/0097346 | A1 | 4/2012 | Ng | |
| 2015/0292261 | A1 | 10/2015 | Chou | |
| 2018/0313146 | A1 | 11/2018 | Blair et al. | |
| 2020/0355026 | A1 | 11/2020 | Liu et al. | |
| 2021/0002958 | A1 | 1/2021 | Meyerink et al. | |

* cited by examiner

ROLLER SHADE HEM BAR ASSEMBLY

BACKGROUND OF THE INVENTION

Technical Field

Aspects of the embodiments relate to shades, and more particularly to systems, methods, and modes for a roller shade hem bar assembly that attaches to the shade material of the roller shade without welding.

Background Art

Roller shades are effective in screening windows, doors, or the like, to achieve privacy and thermal effects. A roller shade typically includes a rectangular shade material, such as fabric, attached at its top end to a cylindrical rotating tube, called a roller tube, and at an opposite bottom end to a hem bar. The shade material is wrapped around the roller tube. The roller tube is rotated, either manually or via an electric motor, in a first direction to roll down the shade material to cover a window and in a second direction to roll up the shade material to uncover the window. The hem bar provides weight to the free hanging end of the shade material enabling it to move smoothly as the roller tube rotates.

Hem bar designs come in various styles to achieve different effects. Shade material may be attached to an exposed hem bar that may be available in various color options to add a decorative hardware element to the bottom of the shade. Alternatively, the shade material may be partially or fully wrapped about the hem bar so that the hem bar finish matches the shade material. Often, different types of hem bars are required to achieve each different hem bar style.

In addition, welding is typically requires to attach the shade material to the hem bar. In a pocketed construction, a pocket is formed by the terminal end of the shade material by folding the shade material and welding it onto itself. A metal rod is then inserted into the pocket to provide weight. In other designs, the free handing end of the shade material is welded or fused to a longitudinal spline. An extruded hem bar is provided which in turn contains a longitudinal opening containing a spline receiving channel within the hem bar. The spline with the fused shade material is inserted through a side end of the hem bar into the channel and longitudinally slid through the hem bar until the hem bar is centered with the shade material. Welding, however, may cause the material to appear wavy or puckered, or it may shrink the material. Additionally, welding does not work for shade material that do not weld well, resulting in the appearance of puckering. Also, there are several fabrics that do not have good weld strength, which include materials with multi-ply and delaminate, causing welding to come apart. Welding also makes it difficult to replace a damaged hem bar or shade material.

Other solutions exist that circumvent welding by folding the shade material and inserting the folded end of the shade material through the longitudinal opening in the hem bar and into the longitudinal channel such that a pocket is formed within the longitudinal channel. A metal rod or spline is then inserted through the end of the hem bar and into the shade material pocket. Such process may, however, be complicated as it requires to fish the rod or spline through the shade material pocket, particularly when dealing with textured fabrics that may catch on the rod or spline that is being inserted. This may further cause the shade material to pucker and may damage the shade when trying to slide in a rod of a substantial length.

Accordingly, a need has arisen for a hem bar assembly that simplifies the process of securing the hem bar to the shade material without causing damage to the shade material and which can achieve different hem bar styles.

SUMMARY OF THE INVENTION

It is therefore an object of the embodiments to substantially solve at least the problems and/or disadvantages discussed above, and to provide at least one or more of the advantages described below.

It is a general aspect of the embodiments to provide systems, methods, and modes for a hem bar assembly that simplifies the process of securing the hem bar to the shade material without causing damage to the shade material and which can achieve different hem bar styles.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Further features and advantages of the aspects of the embodiments, as well as the structure and operation of the various embodiments, are described in detail below with reference to the accompanying drawings. It is noted that the aspects of the embodiments are not limited to the specific embodiments described herein. Such embodiments are presented herein for illustrative purposes only. Additional embodiments will be apparent to persons skilled in the relevant art(s) based on the teachings contained herein.

DISCLOSURE OF INVENTION

According to one aspect of the embodiments, a hem bar assembly is provided that secures to a shade material of a roller shade which selectively covers or uncover an architectural opening. The hem bar assembly comprises a first and a second longitudinal hem bar portions each longitudinally extending from a first terminal end to a second terminal end and comprising an outer face and an inner face vertically extending between a first edge and a second edge, wherein the inner face of each of the first and second longitudinal hem bar portions comprises a first channel proximate to the first edge, a second channel proximate to the second edge, and a third channel located between the first and second channels. The hem bar assembly also comprises at least one tubular spline adapted to wedge and retain the shade material within one of the first channel and the second channel of one of the first and second hem bar portions. The hem bar assembly further comprises a longitudinal retaining clip comprising at least a pair of oppositely disposed hooked arms outwardly extending therefrom, wherein each hooked arm is adapted to enter and clip to one of the third channels in a respective first and second hem bar portions to attach the first hem bar portion to the second hem bar portion. The shade material is adapted to be retained between the first hem bar portion and the second hem bar portion.

According to an embodiment, each of the first and second channels comprises a longitudinal opening with protrusions inwardly extending on opposite ends of the opening, wherein the protrusions are adapted to retain the at least one tubular spline within a respective one of the first and second channels. According to an embodiment, the at least one tubular spline comprises a flexible material with shape retaining properties. According to another embodiment, the at least one tubular spline comprises a ribbed outer surface.

According to an embodiment, each of the third channels comprises a longitudinal opening with at least one protrusion inwardly extending from the opening, wherein each of the hooked arms of the retaining clip may comprise at least one protrusion adapted to engage and hook onto the at least one protrusion in the opening of one of the third channels. According to an embodiment, the retaining clip comprise a pair of upper hooked arms and a pair of lower hooked arms, wherein the pair of upper hooked arms are adapted to translate with respect to the lower hooked arms upon entering one of the third channels. According to a further embodiment, each of the third channels comprises a longitudinal opening with protrusions inwardly extending on opposite ends of the opening, wherein each protrusion of the opening comprises a tapered surface, wherein the tapered surface is adapted to guide one of the hooked arms of the retaining clip into a respective one of the third openings, and wherein the hooked arms are adapted to hook onto the protrusion in the opening of one of the third channels. According to an embodiment, each hooked arm comprises a plurality of protrusions adapted to clip to one of the third channels to accommodate different shade material widths. According to a further embodiment, each of the third channels comprises an alignment projection extending therefrom, wherein the retaining clip comprises oppositely disposed alignment channels, wherein when the retaining clip is being clipped to the third channels of the first and second hem bar portions each alignment projection enters a respective alignment channel to align the first and second hem bar portions at substantially same height.

According to an embodiment, at least one of the first and second hem bar portions comprises at least one compressible strip proximate to the first or second edges to reduce gaps between the first and second hem bar portions.

According to one embodiment, the hem bar assembly is adapted to be attached to the shade material such that the outer faces of the first and second hem bar portions are exposed. According to another embodiment, the shade material is adapted to be wrapped over the outer face of at least one of the first and second hem bar portions, wherein the at least one tubular spline comprise a pair of tubular splines adapted to wedge and retain the shade material within the first channel and the second channel of one of the first and second hem bar portions. According to yet another embodiment, the shade material is adapted to be wrapped over the outer faces of the first and second hem bar portions, wherein the at least one tubular spline comprise a pair of tubular splines adapted to wedge and retain the shade material within the first channels of the first and second hem bar portions.

According to an embodiment, the hem bar assembly further comprises a pair of end caps adapted to be attached to the first and second terminal ends of the first and second hem bar portions to further retain the first and second hem bar portions together. According to a further embodiment, each of the pair of end caps comprises a body adapted to cover at least one of the first and second terminal ends and at least one projection extending from the body, wherein the at least one projection is adapted to be inserted through one of the first and second terminal ends of the first and second hem bar portions and into the third channels of the first and second hem bar portions. According to an embodiment, each projection of the pair of end caps further comprises arms sized to abut at least one inner surface of a respective third channel to retain the projection of the end cap therein.

According to another aspect of the embodiments, a hem bar assembly is provided that secures to a shade material of a roller shade which selectively covers or uncover an architectural opening. The hem bar assembly comprises a first and a second longitudinal hem bar portions each longitudinally extending from a first terminal end to a second terminal end and comprising an outer face and an inner face vertically extending between a first edge and a second edge, wherein the inner face of the first hem bar portion comprises a first channel proximate to the first edge, wherein the inner face of each of the first and second hem bar portions comprises a second channel located between the first and second edges. The hem bar assembly also comprises a tubular spline adapted to wedge and retain the shade material within the first channel. The hem bar assembly further comprises a longitudinal retaining clip comprising at least a pair of oppositely disposed hooked arms outwardly extending therefrom, wherein each hooked arm is adapted to enter and clip to one of the second channels in a respective first and second hem bar portions to attach the first hem bar portion to the second hem bar portion. The shade material is adapted to be retained between the first hem bar portion and the second hem bar portion.

According to yet another aspect of the embodiments, a hem bar assembly is provided that secures to a shade material of a roller shade which selectively covers or uncover an architectural opening. The hem bar assembly comprises a first and a second longitudinal hem bar portions each longitudinally extending from a first terminal end to a second terminal end and comprising an outer face and an inner face vertically extending between a first edge and a second edge, wherein the inner face of the first hem bar portion comprises a first channel proximate to the first edge and a second channel proximate to the second edge, wherein the inner face of each of the first and second hem bar portions comprises a third channel located between the first and second edges. The hem bar assembly also comprises a tubular spline adapted to wedge and retain the shade material within the first channel and the second channel, wherein the shade material is adapted to wrap around the outer face of the first hem bar portion. The hem bar assembly further comprises a longitudinal retaining clip comprising at least a pair of oppositely disposed hooked arms outwardly extending therefrom, wherein each hooked arm is adapted to enter and clip to one of the third channels in a respective first and second hem bar portions to attach the first hem bar portion to the second hem bar portion. The shade material is adapted to be retained between the first hem bar portion and the second hem bar portion.

According to another aspect of the embodiments, a hem bar assembly is provided that secures to a shade material of a roller shade which selectively covers or uncover an architectural opening. The hem bar assembly comprises a first and a second longitudinal hem bar portions each longitudinally extending from a first terminal end to a second terminal end and comprising an outer face and an inner face vertically extending between a first edge and a second edge, wherein the inner face of each of the first and second hem bar portions comprises a first channel located proximate to the first edge and a second channel located between the first and second edges. The hem bar assembly also comprises a pair of tubular splines each adapted to wedge and retain the shade material within the first channels of the first and second hem bar portions, wherein the shade material is adapted to wrap around the outer faces of the first and second hem bar portions. The hem bar assembly further comprises a longitudinal retaining clip comprising at least a pair of oppositely disposed hooked arms outwardly extending therefrom, wherein each hooked arm is adapted to enter and clip to one of the third channels in a respective first and second hem bar portions to attach the first hem bar portion to the second hem bar portion. The shade material is adapted to be retained between the first hem bar portion and the second hem bar portion.

BRIEF DESCRIPTION OF THE DRAWINGS

The above and other objects and features of the embodiments will become apparent and more readily appreciated from the following description of the embodiments with reference to the following figures. Different aspects of the embodiments are illustrated in reference figures of the drawings. It is intended that the embodiments and figures disclosed herein are to be considered to be illustrative rather than limiting. The components in the drawings are not necessarily drawn to scale, emphasis instead being placed upon clearly illustrating the principles of the aspects of the embodiments. In the drawings, like reference numerals designate corresponding parts throughout the several views.

BRIEF DESCRIPTION OF THE SEVERAL VIEWS OF THE DRAWING

Figure 1:
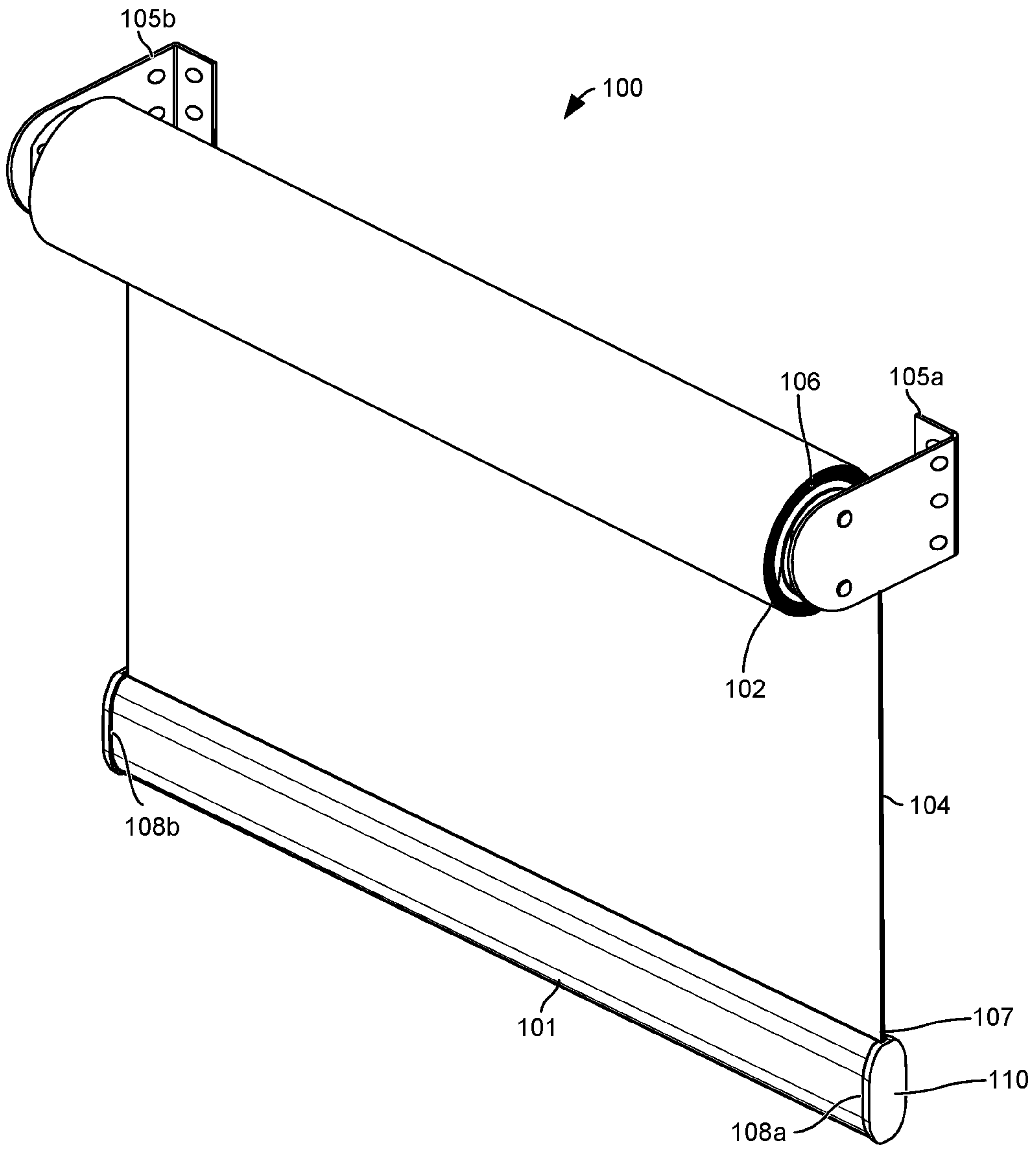

FIG. 1 illustrates a front perspective view of a roller shade comprising a hem bar assembly according to one aspect of the embodiments.

Figure 2:
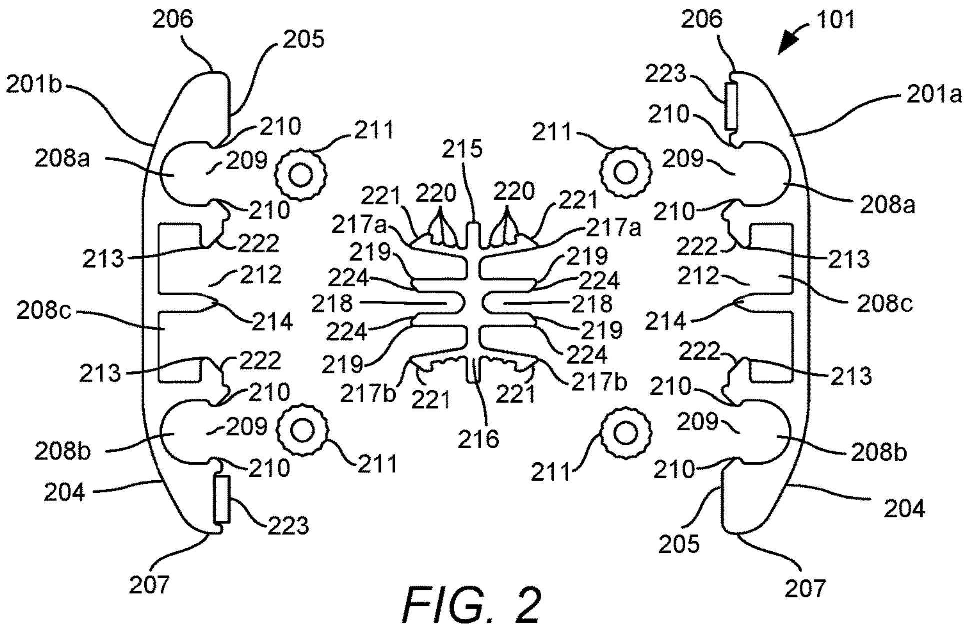

FIG. 2 illustrates an exploded cross sectional view of the hem bar assembly according to an aspect of the embodiments.

Figure 3:
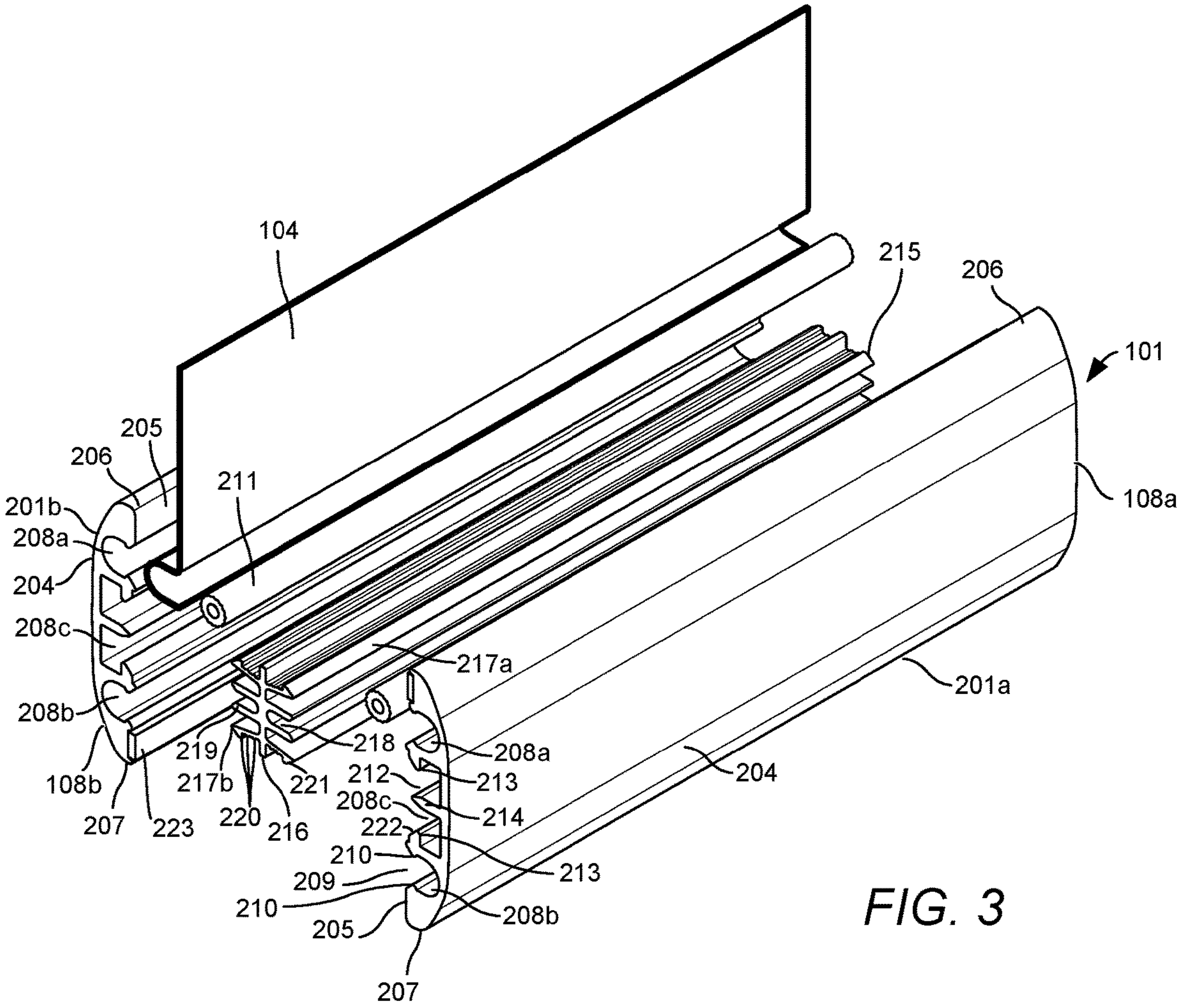

FIG. 3 illustrates an exploded perspective view of the hem bar assembly and shade material according to an aspect of the embodiments.

Figure 4A:
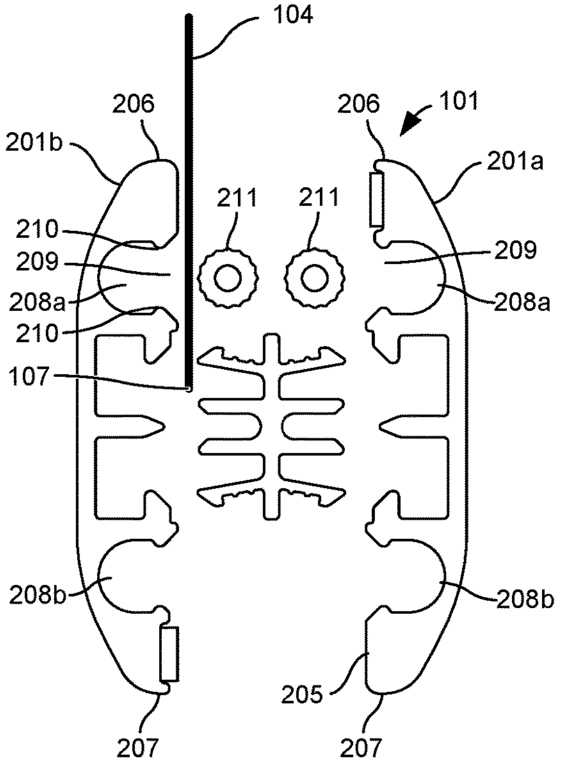
Figure 4B:
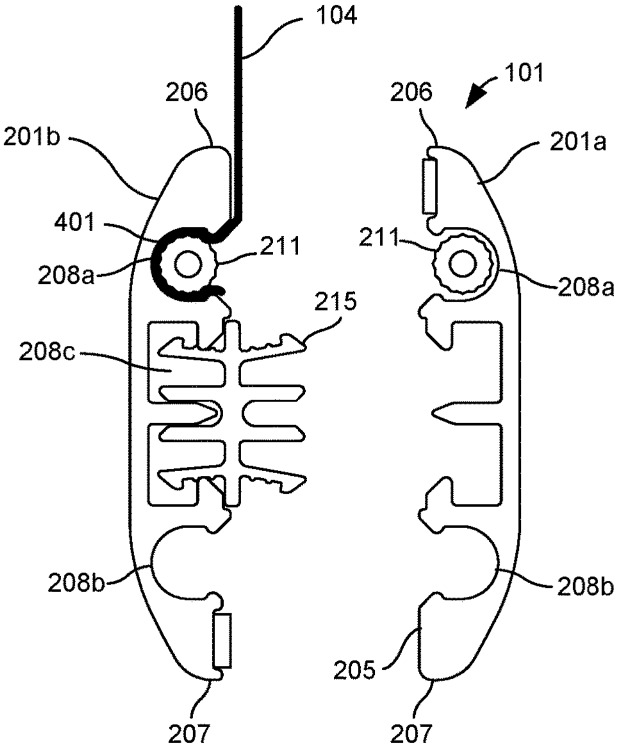
Figure 4C:
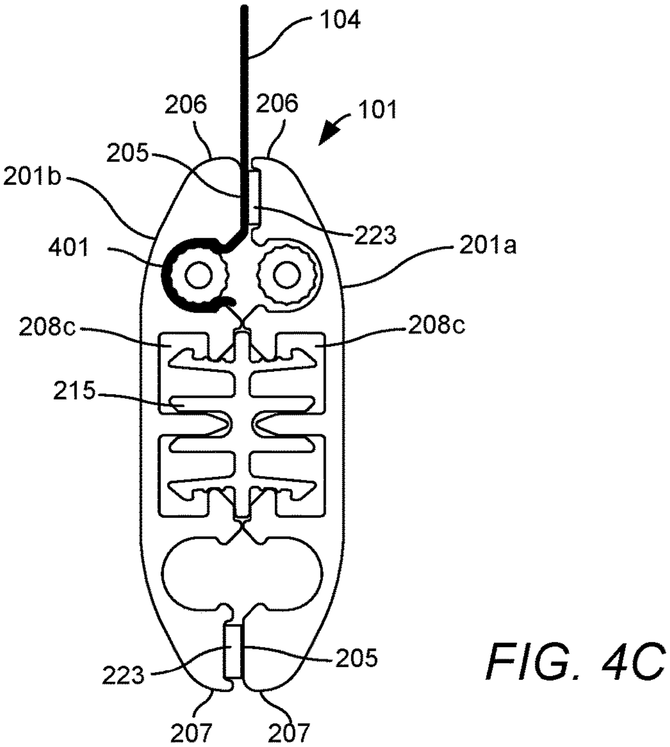

FIGS. 4A-4C illustrate the steps of attaching the hem bar assembly to the shade material in an exposed hem bar style according to an aspect of the embodiments.

Figure 5A:
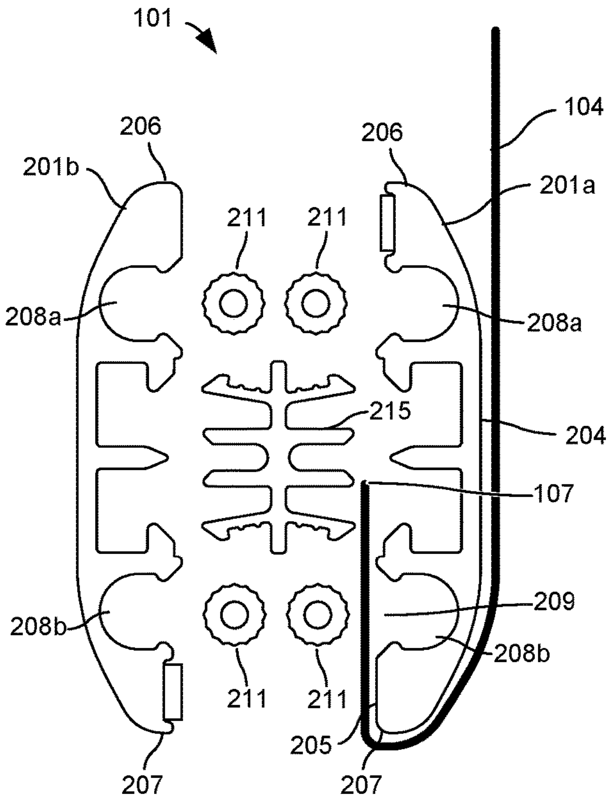
Figure 5B:
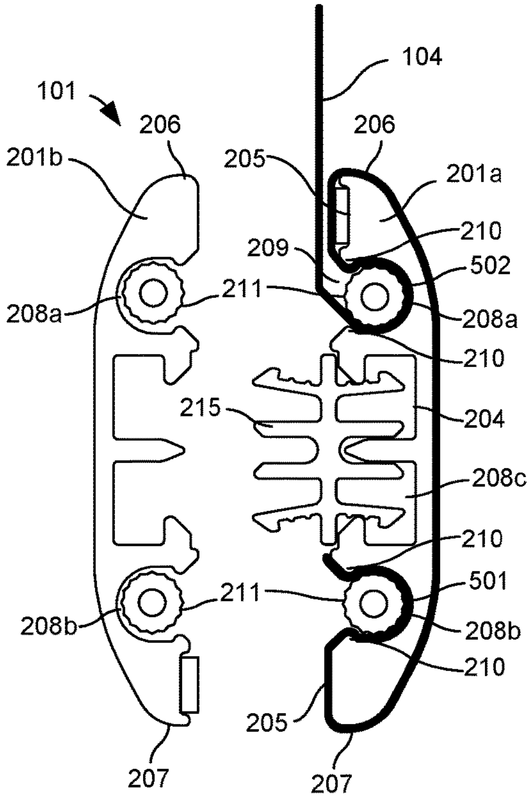
Figure 5C:
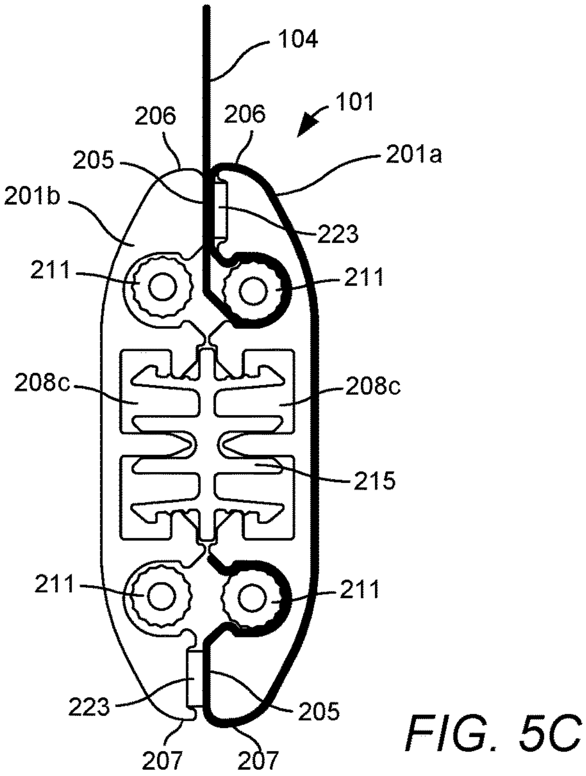

FIGS. 5A-5C illustrate the steps of attaching the hem bar assembly to the shade material in a partially wrapped hem bar style according to an aspect of the embodiments.

FIGS. 6A-6D illustrate the steps of attaching the hem bar assembly to the shade material in a fully wrapped hem bar style according to an aspect of the embodiments.

Figure 7:
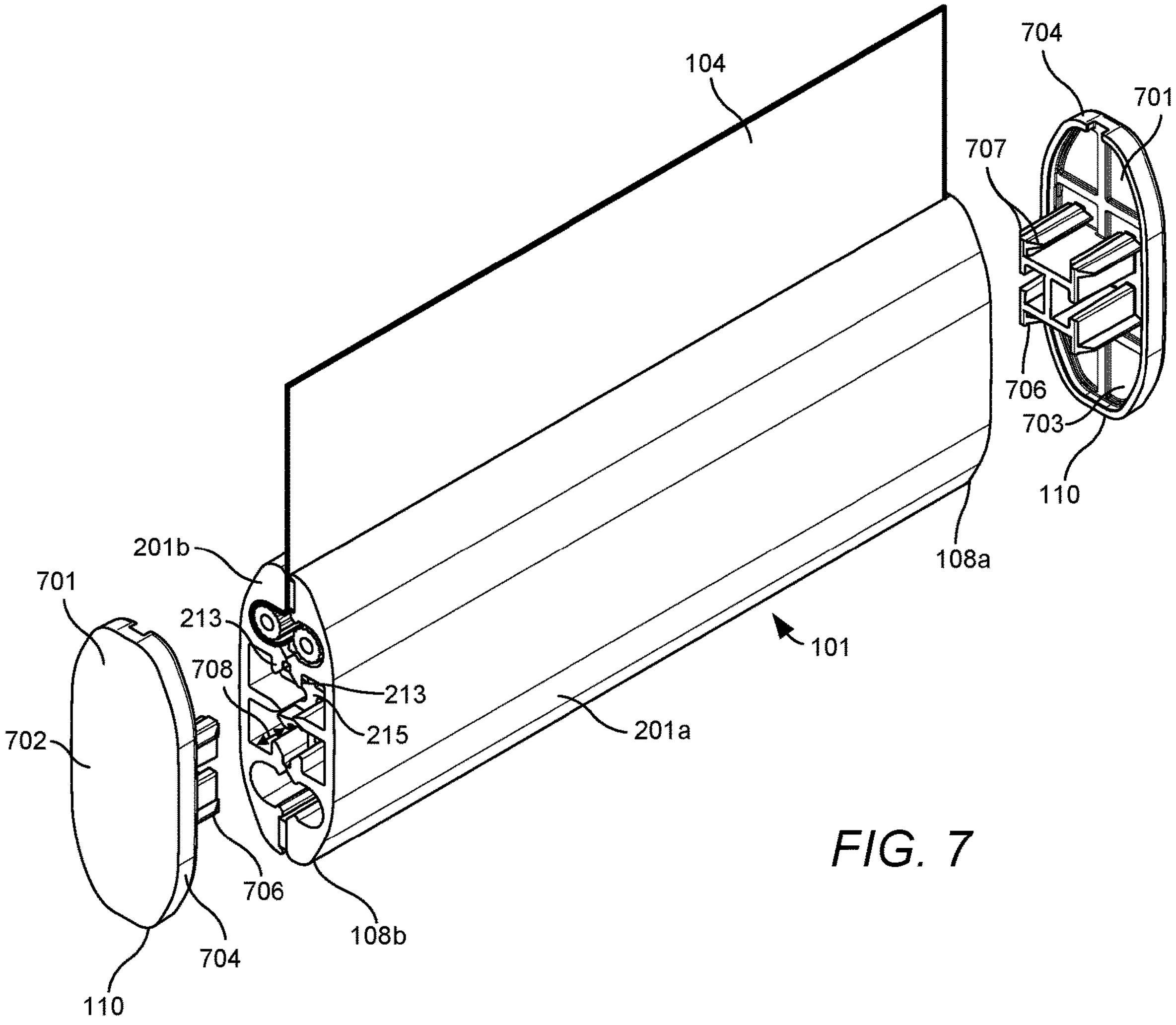

FIG. 7 illustrates a perspective view of the hem bar assembly with the end caps removed according to an aspect of the embodiments.

Figure 8:
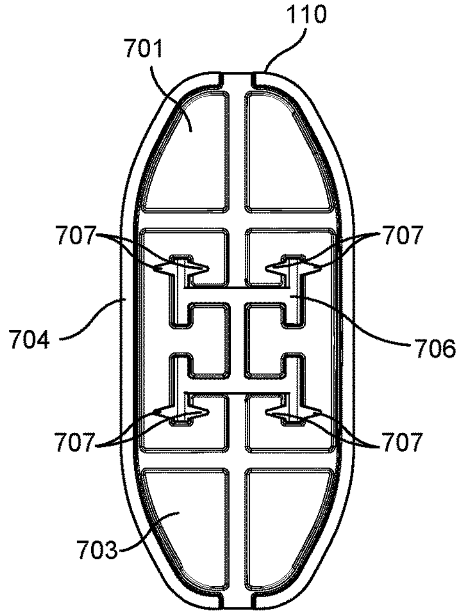

FIG. 8 illustrates an elevated view of the inner face of an end cap according to an aspect of the embodiments.

Figure 9:
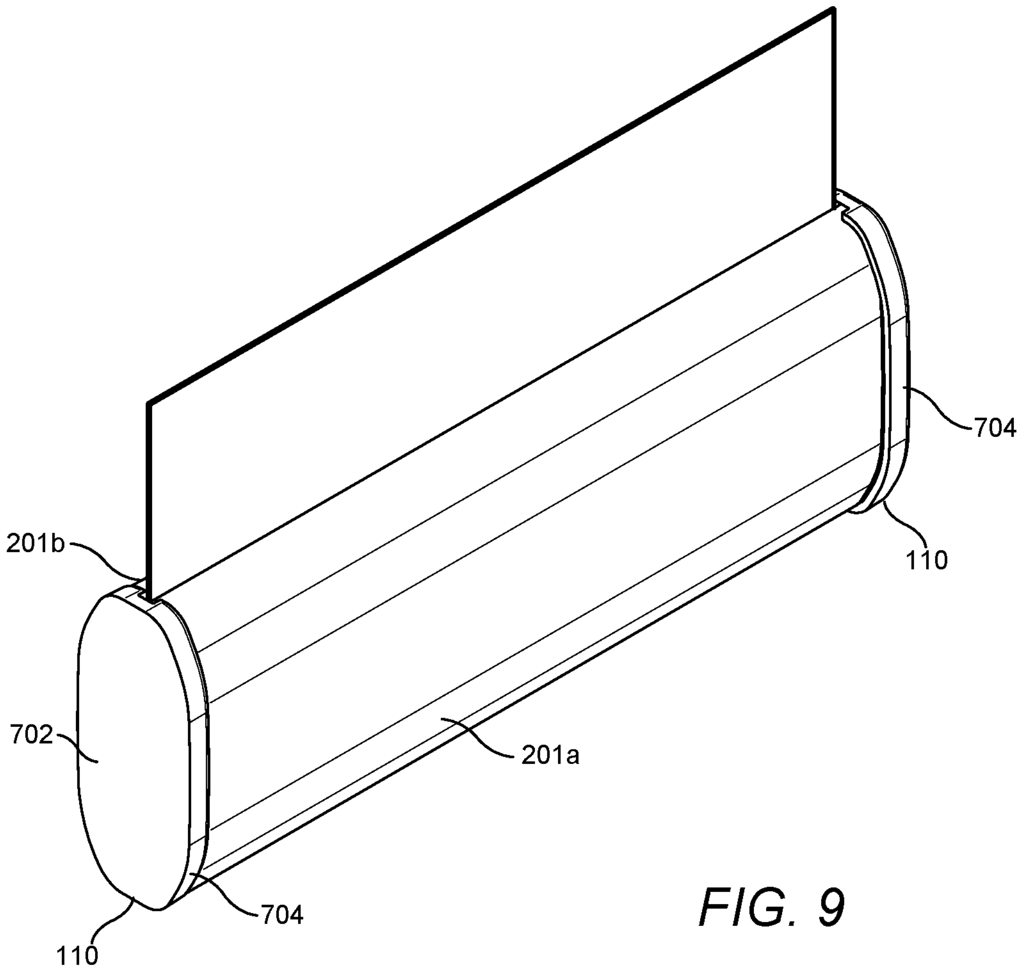

FIG. 9 illustrates a perspective view of the hem bar assembly with the end caps attached according to an aspect of the embodiments.

Figure 10:
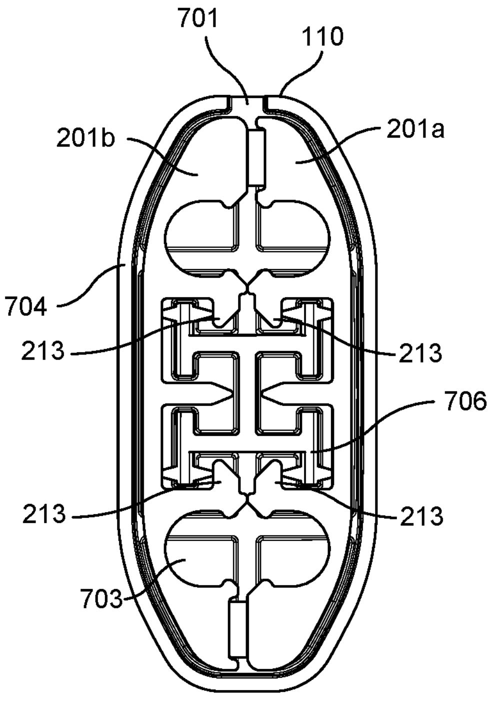

FIG. 10 illustrates a cross sectional view of the hem bar assembly with an end cap attached according to an aspect of the embodiments.

DETAILED DESCRIPTION OF THE INVENTION

The embodiments are described more fully hereinafter with reference to the accompanying drawings, in which embodiments of the inventive concept are shown. In the drawings, the size and relative sizes of layers and regions may be exaggerated for clarity. Like numbers refer to like elements throughout. The embodiments may, however, be embodied in many different forms and should not be construed as limited to the embodiments set forth herein. Rather, these embodiments are provided so that this disclosure will be thorough and complete, and will fully convey the scope of the inventive concept to those skilled in the art. The scope of the embodiments is therefore defined by the appended claims.

Reference throughout the specification to "one embodiment" or "an embodiment" means that a particular feature, structure, or characteristic described in connection with an embodiment is included in at least one embodiment of the embodiments. Thus, the appearance of the phrases "in one embodiment" on "in an embodiment" in various places throughout the specification is not necessarily referring to the same embodiment. Further, the particular feature, structures, or characteristics may be combined in any suitable manner in one or more embodiments.

LIST OF REFERENCE NUMBERS FOR THE ELEMENTS IN THE DRAWINGS IN NUMERICAL ORDER

The following is a list of the major elements in the drawings in numerical order.

100 Roller Shade
101 Hem Bar Assembly
102 Roller Tube
104 Shade Material
105*a* First Mounting Bracket
105*b* Second Mounting Bracket
106 First End of Shade Material
107 Second End of Shade Material
108*a* First End of Hem Bar Assembly
108*b* Second End of Hem Bar Assembly
110 End Caps
201*a* First Hem Bar Portion
201*b* Second Hem Bar Portion
204 Outer Face
205 Inner Face
206 First Edge
207 Second Edge
208*a* First Channel
208*b* Second Channel
208*c* Third Channel
209 Opening
210 Protrusion
211 Tubular Splines
212 Opening
213 Protrusion
214 Alignment Projection
215 Retaining Clip
216 Vertical Body
217*a* Upper Hooked Arms
217*b* Lower Hooked Arms
218 Alignment Channel
219 Arms
220 Protrusions
221 Tapered Surface
222 Tapered Surface
223 Compressible Strip
224 Tapered Surface
401 Loop
501 First Loop
502 Second Loop
601 First Loop
602 Second Loop
701 Body

702 Outer Face
703 Inner Face
704 Flange
706 Projection
707 Arms
708 Space

MODE(S) FOR CARRYING OUT THE INVENTION

For 50 years Crestron Electronics, Inc., has been the world's leading manufacturer of advanced control and automation systems, innovating technology to simplify and enhance modern lifestyles and businesses. Crestron designs, manufactures, and offers for sale integrated solutions to control audio, video, computer, and environmental systems. In addition, the devices and systems offered by Crestron streamlines technology, improving the quality of life in commercial buildings, universities, hotels, hospitals, and homes, among other locations. Accordingly, the systems, methods, and modes of the aspects of the embodiments described herein can be manufactured by Crestron Electronics, Inc., located in Rockleigh, NJ.

The different aspects of the embodiments described herein pertain to the context of roller shades, but are not limited thereto, except as may be set forth expressly in the appended claims. While a roller shade is described herein for covering a window, the roller shade may be used to cover other types of architectural openings, such as doors, wall openings, or the like. The embodiments described herein may further be adapted in other types of window or door coverings, such as inverted rollers, Roman shades, Austrian shades, pleated shades, blinds, shutters, skylight shades, garage doors, or the like. The present embodiments provide systems, methods, and modes for a hem bar assembly that simplifies and speeds up the process of securing the hem bar to the shade material without causing damage to the shade material and which can achieve different hem bar styles. Since no welding is needed, the hem bar assembly of the present embodiments further allows the utilization of a broader selection of shade material types without causing flaws in the material. The hem bar assembly of the present embodiments can be also custom cut into any length as required by shade specifications.

Referring to FIG. 1, there is shown a front perspective view of a roller shade 100 comprising a hem bar assembly 101 according to one embodiment. Roller shade 100 generally comprise a roller tube 102, shade material 104, and a hem bar assembly 101. Shade material 104 is connected at its first end 106, which can be the top end, to the roller tube 102 and at its second end 107, which may be a bottom end, to the hem bar assembly 101 as further described below. Shade material 104 wraps around the roller tube 102 and is rolled on or unrolled from the roller tube 102 to selectively cover an architectural opening, such as a window. Roller tube 102 is generally cylindrical in shape and longitudinally and laterally extends between and attaches to first and second mounting brackets 105*a* and 105*b*, which in turn are mounted to a window frame or another architectural opening. Roller tube 102 is rotated to roll down the shade material 104 to a closed position or rolled up the shade material 104 to an opened position, on in any position therebetween, via a motor, or manually or semi-manually by pulling or tugging on the hem bar assembly 101 or by pulling on a chain or another mechanism (not shown). In various embodiments, the shade material 104 may comprise fabric, plastic, vinyl, or other materials known to those skilled in the art.

Referring to FIGS. 2 and 3, there is shown an exploded cross sectional view and a perspective view of the hem bar assembly 101, respectively, according to one aspect of the embodiments. The hem bar assembly 101 longitudinally extends from a first end 108*a* to a second end 108*b* and may comprise a two-part configuration having a first hem bar portion 201*a* and a second hem bar portion 201*b*. Beneficially the hem bar assembly 101 can be customized to accommodate the width of the architectural opening in which the roller shade 100 is installed. Particularly, the first hem bar portion 201*a* and the second hem bar portion 201*b*, as well as the other components of the hem bar assembly 101, including the tubular splines 211 and the retaining clip 215 discussed below, may be cut to a required length at the factory. First and second hem bar portions 201*a-b* may be made from extruded metal material, such as aluminum; although other materials may be utilized such as other types of metal, plastic, composite material, fiber glass, or the like. Each of the first and second hem bar portions 201*a-b* comprises an outer face 204 and an inner face 205 vertically extending between a first edge 206 and a second edge 207, respectively. Outer face 204 may comprise a substantially C-shaped cross section with a center flat wall terminating with rounded walls at its first and second edges 206 and 207 such that when the first and second portions 201*a-b* are clamped together the hem bar assembly 101 comprises a substantially oval cross-section with flat surfaces. However, the hem bar assembly 101 may comprise other form factors, such as an oval form factor, a convex form factor, a rectangular form factor, a rounded rectangular form factor, or other shapes known in the art. According to an embodiment, the first and second portions 201*a-b* may be identical in configuration and may be attached inversely symmetrical with respect to each other as shown in FIG. 2. According to another embodiment, the first and second portions 201*a-b* may be substantially symmetrical. The outer faces 204 of the first and second portions 201*a-b* may comprise decorative surfaces available in one of a plurality of colors and finishes.

Each of the first and second hem bar portions 201*a-b* may comprise a first longitudinal channel 208*a* proximate to the first edge 206 and a second longitudinal channel 208*b* proximate to the second edge 207. Each of the first and second channels 208*a* and 208*b* may be recessed in the inner face 205 of the respective first and second hem bar portion 201*a-b*. Each of the first and second channels 208*a* and 208*b* may comprise a partially circular cross section with a longitudinal opening 209 granting access therein. Each of the first and second channels 208*a* and 208*b* may further comprise protrusions 210 inwardly extending towards and disposed on opposite ends of the opening 209. The first and second channels 208*a* and 208*b* are adapted to receive flexible tubular splines 211 and retain them therein using the protrusions 210. Tubular splines 211 are adopted to retain shade material 104 within the channels 208*a* and 208*b* via the protrusions 210 as further discussed below. Tubular splines 211 may comprise a natural or synthetic rubber material, which has both a flexibility property, such that it can be compress to enter the opening 209 of the first and/or second channels 208*a* and 208*b*, and a shape retaining property, such that it can substantially retain its shape within the first and/or second channels 208*a* and 208*b* and bias the shade material 104 therein. However, other materials with similar properties may be utilized to retain the shade material 104 within the first and/or second channels 208*a* and 208*b*, such as silicone, nitrile, vinyl, neoprene, or the like. Tubular splines 211 may further comprise a ribbed outer surface to prevent the shade material 104 from slipping out of the first and second channels 208*a* and 208*b*. According to a further embodiment, during assembly at the factory, tubular splines 211 may be selected from a predetermined number of different diameters to accommodate different shade material thickness. A single or a plurality of the tubular splines 211 may be used to retain the shade material 104 depending on the selected hem bar style, as illustrated below. Additional tubular splines 211 may be also used, as discussed below, to add additional weight to the hem bar assembly 101 and/or to maintain proper balance. Tubular splines 211 may be cut to substantially the same length as the first and second hem bar portions 201*a-b*.

Each of the first and second hem bar portions 201*a-b* may further comprise a third longitudinal channel 208*c* that can be substantially centrally disposed between the first and the second channels 208*a* and 208*b*. According to an embodiment, the third channel 208*c* may comprise a rectangular cross section with a longitudinal opening 212. The third channel 208*c* may further comprise protrusions 213 inwardly extending and disposed on opposite ends of the opening 212. Each protrusion 213 may comprise an outer tapered surface 222. In addition, each third channel 208*c* may comprise an alignment projection 214 extending substantially from its center towards the opening 212, which may divide the third channel 208*c* into a pair of compartments. The third channel 208*c* of the first and second hem bar portions 201*a-b* is adapted to engage a longitudinal retaining clip 215. The retaining clip 215 is adapted to connect to and lock the two hem bar portions 201*a-b* together.

Retaining clip 215 may comprise a longitudinal vertical body 216. Retaining clip 215 may further comprise a pair of upper hooked arms 217*a* and a pair of lower hooked arms 217*b* angularly and outwardly extending from the opposite sides of the longitudinal vertical body 216. According to an embodiment, upper hooked arms 217*a* and lower hooked arms 217*b* may be angularly extending away from each other. Retaining clip 215 may comprise a flexible but resilient material, such as polyvinyl chloride (PVC), polypropylene, or the like, such that the hooked arms 217*a-b* can translate with respect to the vertical body 216. Each hooked arm 217*a-b* may further comprise one, two, three or more protrusions or bumps 220 outwardly extending therefrom. According to an embodiment, each outermost protrusion 220 may comprise a tapered surface 221 adapted to cooperate with the tapered surface 222 of a respective protrusion 213 of the third channel 208*c* in the first and second hem bar portions 201*a-b*.

Portions of the retaining clip 215 are adapted to be force fitted within each third channel 208*c* of the first and second hem bar portions 201*a-b* to connect them together. Particularly, the retaining clip 215 may be secured to the first hem bar portion 201*a* by press fitting the upper and lower hooked arms 217*a-b* extending from one side of the retaining clip body 215 into the third channel 208*c* of the first hem bar portion 201*a* whereby the tapered surfaces 222 of the channel 208*c* will engage the tapered surfaces 221 of the hooked arms 217*a-b* causing the hooked arms 217*a-b* to translate towards each other and be guided into the opening 212 of the third channel 208*c*. When the hooked arms 217*a-b* are inserted past the protrusions 213 and into the opening 212 of the third channel 208*c*, the hooked arms 217*a-b* may then translate away from each other such that the protrusions 220 of the hooked arms 217*a-b* engage the protrusions 213 of the third channel 208*c*. The retaining clip 215 may be secured to the second hem bar portion 201*b* in a similar fashion by press fitting the hooked arms 217*a-b* extending from the other side of the retaining clip body 215 into the third channel 208*c* of the second hem bar portion 201*b*. The plurality of protrusions 220 are adapted to accommodate different shade material thickness and/or layers. For thicker shade material 104 or for a plurality of layers, the outermost protrusions 220 would hook onto the respective protrusions 213 of the third channel 208*c*. For thinner shade material 104 or a single layer, one of the inner protrusions 220 would be used to catch the respective protrusions 213 of the third channel 208*c*. Retaining clip 215 may further comprise oppositely disposed longitudinal alignment channels 218 on each side of its body 216 that may be formed via a pair of parallel arms 219 traversely extending from opposite sides of the body 216. Each channel 218 may contain tapered surfaces 224 disposed on opposite sides of an opening into the channel 218. When the clip 215 is clipped within the third channels 208*c* of the first and second hem bar portions 201*a-b*, the alignment projections 214 of each third channel 208*c* is adapted to be guided into and inserted within the oppositely disposed alignment channels 218 of the retaining clip 215 to align the two hem bar portions 201*a-b* at the same height with respect to each other. According to an embodiment, if desired, the first and second portions 201*a-b* may be subsequently disengaged from each other by longitudinally pulling or pushing the retaining clip 215 within the third channels 208*c* out of the first end 108*a* or the second end 108*b* of the first and second hem bar portions 201*a-b*.

Each of the first and second hem bar portions 201*a-b* may also comprise at least one compressible strip 223 disposed proximate to the first and/or the second edges 206-207. Each compressible strip 223 may comprise rubber foam material or other compressible material know in the art. Each compressible strip 223 is adapted to bias against the shade material 104 between the first or second hem bar portions 201*a-b*, or against the inner surface 205 of the opposing hem bar portion 201*a-b* if there is no shade material 104 therebetween, to reduce gaps and slack between the hem bar portions 201*a-b* and/or the shade material 104 proximate to the first edge 206 and/or the second edge 207.

Referring now to FIGS. 4A-4C, there is illustrated the steps of attaching the hem bar assembly 101 to the shade material 104 in an exposed hem bar style where the outer faces 204 of the first and second hem bar portions 201*a-b* are exposed. Referring to FIG. 4A, according to one embodiment, the shade material 104 may be positioned in proximity to the first edge 206 of the second hem bar portion 201*b* such that the second end 107 of the shade material 104 extends over the opening 209 of the first channel 208*a* in the second portion 201*b*. Tubular spline 211 is then press fitted over the shade material 104 through the opening 209 and into the first channel 208*a* of the second portion 201*b* and retained therein via protrusions 210 as shown in FIG. 4B. This causes the shade material 104 located therebetween to be inserted into the first channel 208*a* and to form a loop 401 surrounding the tubular spline 211 such that the shade material 104 is wedged and retained within the first channel 208*a* via the tubular spline 211. A second tubular spline 211 may be press fitted into the first channel 208*a* of the first hem bar portion 201*a* to add weight and balance to the hem bar assembly 101. Although not shown, additional tubular splines 211 may be press fitted in the second channels 208*b* of the first and second portions 201*a-b* to add additional weight and balance. Retaining clip 215 may then be force fitted and clipped to the third channel 208*c* of the second hem bar portion 201*b* as discussed above and as shown in FIG. 4B. Finally, the first hem bar portion 201*a* is secured to the second hem bar portion 201*b* by force fitting and clipping the retaining clip 215 to the third channel 208*c* of the first hem bar portion 201*a* as shown in FIG. 4C. Proximate to the first edges 206 of the first and second hem bar portions 201*a-b*, the compressible strip 223 is biased against the shade material 104 such that the shade material 104 is compressed between the first and second hem bar portions 201*a-b*. Proximate to the second edges 207 of the first and second hem bar portions 201*a-b*, the compressible strip 223 is biased against the inner face 205 of the first hem bar portion 201*a*. It should be understood, however, that the shade material 104 may be instead secured to the first channel 208*a* of the first hem bar portion 201*a* and similarly that the retaining clip 215 can be first secured to the third channel 208*c* of the first hem bar portion 201*a*.

According to another embodiment, FIGS. 5A-5C illustrate the steps of attaching the hem bar assembly 101 to the shade material 104 in a partially wrapped hem bar style where only the outer face 204 of one of the first or the second hem bar portions 201*a-b* is wrapped with shade material 104. Referring to FIG. 5A, the shade material 104 proximate to its second end 107 is positioned over the opening 209 of the second channel 208*b* of the first hem bar portion 201*a* and extended out of the second edge 207 of the first hem bar portion 201*a*. A tubular spline 211 together with the shade material 104 is force-fitted into the second channel 208*b* as shown in FIG. 5B. This causes the shade material 104 to form a first loop 501 and be wedged and retained within the second channel 208*b* of the first hem bar portion 201*a* via the tubular spline 211. The shade material 104 is then wrapped over the second edge 207 of the first hem bar portion 201 a, around its outer face 204, over its first edge 206 and inner face 205, and over opening 209 of the first channel 208*a* as shown in FIG. 5B. A tubular spline 211 together with the shade material 104 is then force-fitted into the first channel 208*a* as shown in FIG. causing the shade material 104 to form a second loop 502 and be wedged and retained within the first channel 208*a* of the first hem bar portion 201*a* via the tubular spline 211. The shade material 104 is then brought back over the inner face 205 towards the first edge 206 of the first hem bar portion 201*a* as shown in FIG. 5B. Additional tubular splines 211 may be wedged into the first and second channels 208*a* and 208*b* of the second hem bar portion 201*b* for additional weight and/or balance. Retaining clip 215 may then be force fitted and clipped to the third channel 208*c* of the first hem bar portion 201*a* as discussed above and as shown in FIG. 5B. Finally, the second hem bar portion 201*b* is secured to the first hem bar portion 201*a* by force fitting and clipping the retaining clip 215 to the third channel 208*c* of the second hem bar portion 201*b* as shown in FIG. 5C. The compressible strips 223 biased the shade material 104 against of the inner faces 205 of the first and second hem bar portions 201*a-b*, respectively, to reduce gaps and movement. It should be understood, however, that the shade material 104 may be instead secured to the first and second channels 208*a* and 208*b* of the second hem bar portion 201*b* and similarly that the retaining clip 215 can be first secured to the third channel 208*c* of the second hem bar portion 201*b*.

Figure 6A:
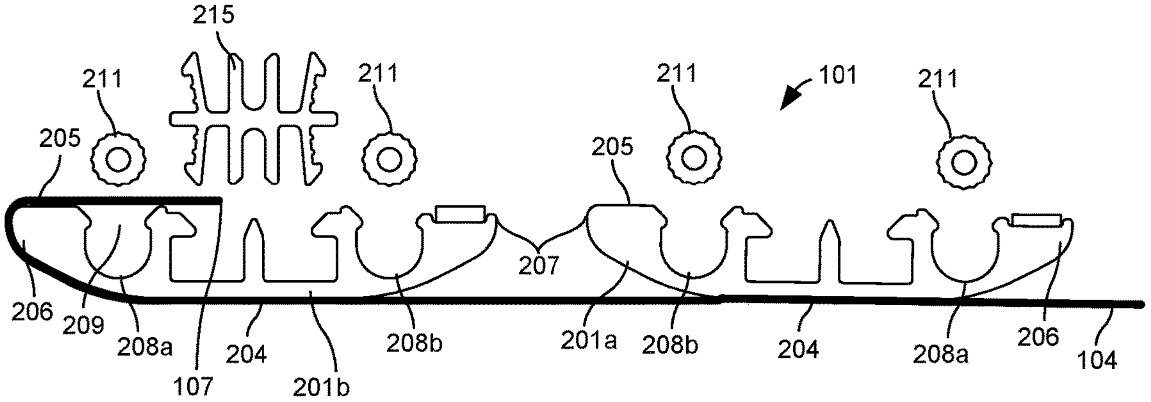
Figure 6B:
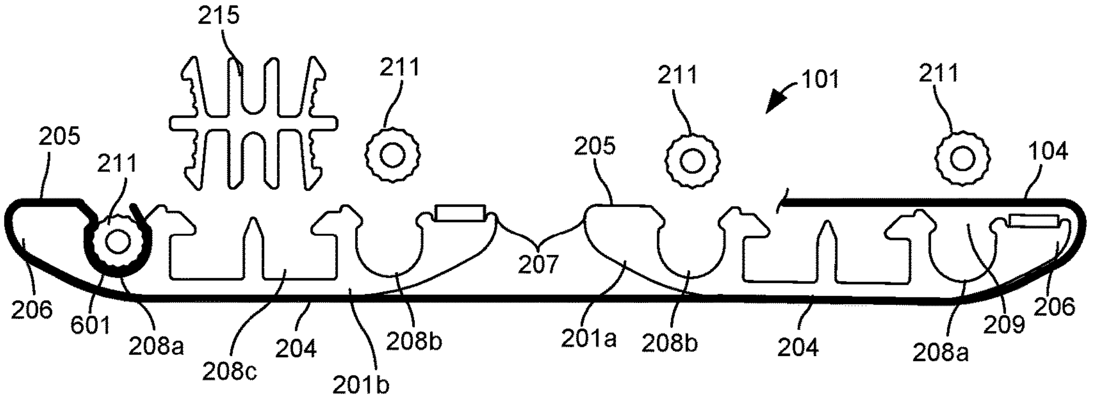
Figure 6C:
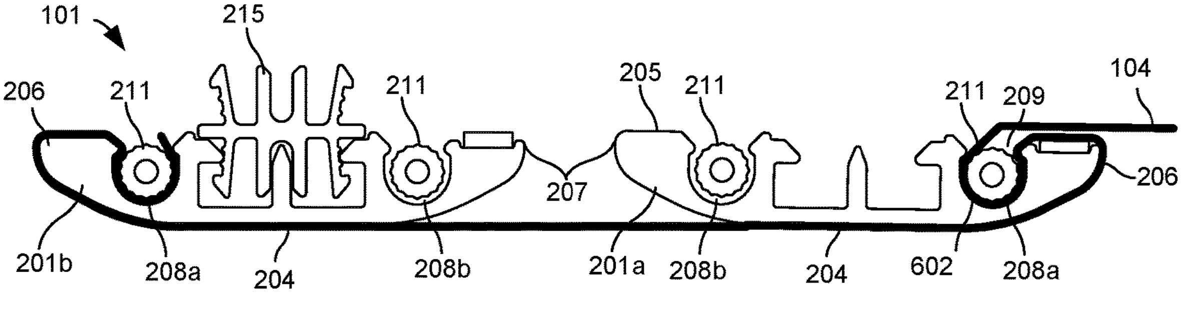
Figure 6D:
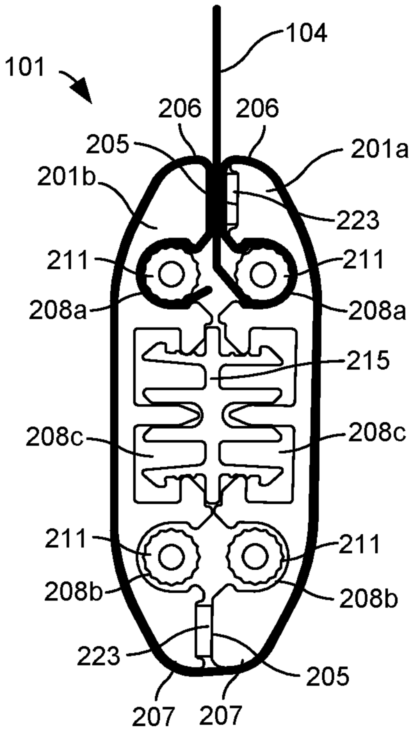

FIGS. 6A-6D illustrate the method of attaching the hem bar assembly 101 to the shade material 104 in a fully wrapped hem bar style according to one aspect of the embodiments. Referring to FIG. 6A, the shade material 104 proximate to its second end 107 may be positioned over the opening 209 of the first channel 208*a* of the second hem bar portion 201*b* and extending out of its first edge 206. A tubular spline 211 together with the shade material 104 may then be force-fitted into the first channel 208*a* of the second hem bar portion 201*b* as shown in FIG. 6B. This causes the shade material 104 to form a first loop 601 and be wedged and retained within the first channel 208*a* of the second hem bar portion 201*b* via the tubular spline 211. The shade material 104 is then wrapped over the first edge 206 and over the outer face 204 of the second hem bar portion 201*b* and then over the outer face 204, the first edge 206, and the inner face 205 of the first hem bar portion 201*a* as shown in FIG. 6B. This can be accomplished, for example, by laying the shade material 104 over a surface and positioning the first and second hem bar portions 201*a-b* over the shade material 104 with sufficient distance to allow for the shade material 104 to wrap over their outer faces 204 as shown in FIG. 6B. The shade material 104 is then extended over the opening 209 of the first channel 208*a* of the first hem bar portion 201*a*, as shown in FIG. 6B, and a tubular spline 211 together with the shade material 104 is then force-fitted into the first channel 208*a* of the first hem bar portion 201*a* as shown in FIG. 6C. This causes the shade material 104 to form a second loop 602 and be wedged and retained within the first channel 208*a* of the first hem bar portion 201*a* via the tubular spline 211. The shade material 104 is then brought back over the inner face 205 towards the first edge 206 of the first hem bar portion 201*a* as shown in FIG. 6C. Additional tubular splines 211 may be wedged into the second channels 208*b* of the first and second hem bar portions 201*a-b* for additional weight and/or balance. Retaining clip 215 may then be force fitted and clipped to the third channel 208*c* of the second hem bar portion 201*b* as discussed above and as shown in FIG. 6C. Finally, the first hem bar portion 201*a* is secured to the second hem bar portion 201*b* by bringing the hem bar portions 201*a-b* towards each other and force fitting and clipping the retaining clip 215 to the third channel 208*c* of the first hem bar portion 201*a* as shown in FIG. 6D. The compressible strips 223 bias the layers of the shade material 104 against the inner faces 205 of the first and second hem bar portions 201*a-b* proximate to their first edges 206, respectively, to reduce gaps and movement. It should be understood, however, that the shade material 104 may be instead first secured to the second hem bar portion 201*b* and similarly that the retaining clip 215 can be first secured to the third channel 208*c* of the first hem bar portion 201*a*.

Referring to FIGS. 7 and 8, hem bar assembly 101 may further comprise a pair of end caps 110, with FIG. 7 showing a perspective view of the hem bar assembly 101 and end caps 110 and FIG. 8 showing an elevated view of an inner face 703 of each end cap 110. Each end cap 110 may comprise a similar shape and profile as the interconnected first and second hem bar portions 201*a-b* of the hem bar assembly 101 such that end caps 110 cover the terminal ends 108*a* and 108*b* of the hem bar assembly 101. In addition to providing a decorative finish to the ends 108*a-b* of the hem bar assembly 101, end caps 110 are adapted to further assist in retaining the first and second hem bar portions 201 a-b together. According to an embodiment, each end cap 110 may comprise a substantially flat body 701 comprising an outer face 702 and an inner face 703. Each end cap 110 may further comprise a flange 704 surrounding the body 701 and laterally extending from its inner face 703. Each end cap 110 is sized to cover a respective terminal end 108*a-b* of the hem bar assembly 101 such that the flange 704 fits over terminal ends of the connected first and second hem bar portions 201*a-b* to minimize gaps as shown in FIG. 9. The outer face 702 of each end cap 110 may comprise a decorative surface complementary to the outer surfaces 204 of the first and second hem bar portions 201*a-b*. The inner face 703 of each end cap 110 may comprise at least one projection 706 comprising a plurality of arms 707 adapted to be retained within the respective third channel 208*c*. Particularly, during assembly, after the first and second hem bar portions 201*a-b* are interconnected via clip 215, the projection 706 of each end cap 110 is inserted through one of the terminal ends 108*a-b* of the interconnected first and second hem bar portions 201*a-b* and into the third channels 208*c* of the first and second hem bar portions 201*a-b*. Arms 707 are sized to abut against the inner surfaces as well as the protrusions 213 of the third channels 208*c* to retain the projection 706 therein as shown in FIG. 10. According to an embodiment, during assembly, the longitudinal clip 215 may be cut shorter than the length of the first and second hem bar portions 201*a-b* and is clipped substantially at their center to create a space 708 (FIG. 7) within the third channels 208*c* at each terminal end 108*a-b* of the hem bar assembly 101. Each space 708 is sized to receive the length of a respective projection 706 of the respective end cap 110.

INDUSTRIAL APPLICABILITY

To solve the aforementioned problems, the aspects of the embodiments are directed towards a hem bar assembly that simplifies the process of securing the hem bar to the shade material without causing damage to the shade material and which can achieve different hem bar styles. It should be understood that this description is not intended to limit the embodiments. On the contrary, the embodiments are intended to cover alternatives, modifications, and equivalents, which are included in the spirit and scope of the embodiments as defined by the appended claims. Further, in the detailed description of the embodiments, numerous specific details are set forth to provide a comprehensive understanding of the claimed embodiments. However, one skilled in the art would understand that various embodiments may be practiced without such specific details.

Although the features and elements of aspects of the embodiments are described being in particular combinations, each feature or element can be used alone, without the other features and elements of the embodiments, or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

The above-described embodiments are intended to be illustrative in all respects, rather than restrictive, of the embodiments. Thus the embodiments are capable of many variations in detailed implementation that can be derived from the description contained herein by a person skilled in the art. No element, act, or instruction used in the description of the present application should be construed as critical or essential to the embodiments unless explicitly described as such. Also, as used herein, the article "a" is intended to include one or more items.

Additionally, the various methods described above are not meant to limit the aspects of the embodiments, or to suggest that the aspects of the embodiments should be implemented following the described methods. The purpose of the described methods is to facilitate the understanding of one or more aspects of the embodiments and to provide the reader with one or many possible implementations of the processed discussed herein. The steps performed during the described methods are not intended to completely describe the entire process but only to illustrate some of the aspects discussed above. It should be understood by one of ordinary skill in the art that the steps may be performed in a different order and that some steps may be eliminated or substituted.

All United States patents and applications, foreign patents, and publications discussed above are hereby incorporated herein by reference in their entireties.

ALTERNATE EMBODIMENTS

Alternate embodiments may be devised without departing from the spirit or the scope of the different aspects of the embodiments. In various embodiments, the roller shade described herein may be used to cover a window, a door, a wall opening, or the like. In addition, the embodiments described herein may be adapted in other types of window or door coverings, such as inverted rollers, Roman shades, Austrian shades, pleated shades, blinds, shutters, skylight shades, garage doors, or the like.

What is claimed is:

1. A hem bar assembly adapted to secure to a shade material of a roller shade that selectively covers or uncovers an architectural opening, the hem bar assembly comprising:

a first and a second longitudinal hem bar portions each longitudinally extending from a first terminal end to a second terminal end and comprising an outer face and an inner face vertically extending between a first edge and a second edge, wherein the inner face of each of the first and second longitudinal hem bar portions comprises a first channel proximate to the first edge, a second channel proximate to the second edge, and a third channel located between the first and second channels;

at least one tubular spline adapted to wedge and retain the shade material within one of the first channel and the second channel of one of the first and second hem bar portions; and a longitudinal retaining clip comprising at least a pair of oppositely disposed hooked arms outwardly extending therefrom, wherein each of the hooked arms is adapted to enter and clip to one of the third channels in a respective one of the first and second hem bar portions to attach the first hem bar portion to the second hem bar portion;

wherein the shade material is adapted to be retained between the first hem bar portion and the second hem bar portion.

2. The hem bar assembly of claim 1, wherein each of the first and second channels comprises a longitudinal opening with protrusions inwardly extending on opposite ends of the opening, wherein the protrusions are adapted to retain the at least one tubular spline within a respective one of the first and second channels.

3. The hem bar assembly of claim 1, wherein the at least one tubular spline comprises a flexible material with shape retaining properties.

4. The hem bar assembly of claim 1, wherein the at least one tubular spline comprises a ribbed outer surface.

5. The hem bar assembly of claim 1, wherein each of the third channels comprises a longitudinal opening with at least one protrusion inwardly extending from the opening, wherein each of the hooked arms of the retaining clip may comprise at least one protrusion adapted to engage and hook onto the at least one protrusion in the opening of one of the third channels.

6. The hem bar assembly of claim 1, wherein the hooked arms comprise a pair of upper hooked arms and a pair of lower hooked arms, wherein the pair of upper hooked arms are adapted to translate with respect to the lower hooked arms upon entering one of the third channels.

7. The hem bar assembly of claim 6, wherein each of the third channels comprises a longitudinal opening with protrusions inwardly extending on opposite ends of the opening, wherein each of the protrusions of the opening comprises a tapered surface, wherein the tapered surface is adapted to guide one of the hooked arms of the retaining clip into a respective one of the third openings, and wherein the hooked arms are adapted to hook onto the protrusion in the opening of one of the third channels.

8. The hem bar assembly of claim 1, wherein each of the hooked arms comprises a plurality of protrusions adapted to clip to one of the third channels to accommodate different shade material widths.

9. The hem bar assembly of claim 1, wherein each of the third channels comprises an alignment projection extending therefrom, wherein the retaining clip comprises oppositely disposed alignment channels, wherein when the retaining clip is being clipped to the third channels of the first and second hem bar portions each of the alignment projections enters a respective one of the alignment channels to align the first and second hem bar portions at substantially a same height.

10. The hem bar assembly of claim 1, wherein at least one of the first and second hem bar portions comprises at least one compressible strip proximate to the first or second edges to reduce gaps between the first and second hem bar portions.

11. The hem bar assembly of claim 1, wherein the hem bar assembly is adapted to be attached to the shade material such that the outer faces of the first and second hem bar portions are exposed.

12. The hem bar assembly of claim 1, wherein the shade material is adapted to be wrapped over the outer face of at least one of the first and second hem bar portions, wherein the at least one tubular spline comprise a pair of tubular splines adapted to wedge and retain the shade material within the first channel and the second channel of one of the first and second hem bar portions.

13. The hem bar assembly of claim 1, wherein the shade material is adapted to be wrapped over the outer faces of the first and second hem bar portions, wherein the at least one tubular spline comprise a pair of tubular splines adapted to wedge and retain the shade material within the first channels of the first and second hem bar portions.

14. The hem bar assembly of claim 1 further comprising a pair of end caps adapted to be attached to the first and second terminal ends of the first and second hem bar portions to further retain the first and second hem bar portions together.

15. The hem bar assembly of claim 14, wherein each of the pair of end caps comprises a body adapted to cover at least one of the first and second terminal ends and at least one projection extending from the body, wherein the at least one projection is adapted to be inserted through one of the first and second terminal ends of the first and second hem bar portions and into the third channels of the first and second hem bar portions.

16. The hem bar assembly of claim 15, wherein each of the projections of the pair of end caps further comprises arms sized to abut at least one inner surface of a respective one of the third channels to retain the projection of the end cap therein.

17. A hem bar assembly adapted to secure to a shade material of a roller shade that selectively covers or uncovers an architectural opening, the hem bar assembly comprising:
- a first and a second longitudinal hem bar portions each longitudinally extending from a first terminal end to a second terminal end and comprising an outer face and an inner face vertically extending between a first edge and a second edge, wherein the inner face of the first hem bar portion comprises a first channel proximate to the first edge, wherein the inner face of each of the first and second hem bar portions comprises a second channel located between the first and second edges;
- a tubular spline adapted to wedge and retain the shade material within the first channel; and
- a longitudinal retaining clip comprising at least a pair of oppositely disposed hooked arms outwardly extending therefrom, wherein each hooked arm is adapted to enter and clip to one of the second channels in a respective one of the first and second hem bar portions to attach the first hem bar portion to the second hem bar portion;
- wherein the shade material is adapted to be retained between the first hem bar portion and the second hem bar portion.

18. A hem bar assembly adapted to secure to a shade material of a roller shade that selectively covers or uncovers an architectural opening, the hem bar assembly comprising:
- a first and a second longitudinal hem bar portions each longitudinally extending from a first terminal end to a second terminal end and comprising an outer face and an inner face vertically extending between a first edge and a second edge, wherein the inner face of the first hem bar portion comprises a first channel proximate to the first edge and a second channel proximate to the second edge, wherein the inner face of each of the first and second hem bar portions comprises a third channel located between the first and second edges;
- a tubular spline adapted to wedge and retain the shade material within one of the first channel and the second channel, wherein the shade material is adapted to wrap around the outer face of the first hem bar portion; and
- a longitudinal retaining clip comprising at least a pair of oppositely disposed hooked arms outwardly extending therefrom, wherein each hooked arm is adapted to enter and clip to one of the third channels in a respective one of the first and second hem bar portions to attach the first hem bar portion to the second hem bar portion;
- wherein the shade material is adapted to be retained between the first hem bar portion and the second hem bar portion.

19. A hem bar assembly adapted to secure to a shade material of a roller shade that selectively covers or uncovers an architectural opening, the hem bar assembly comprising:
- a first and a second longitudinal hem bar portions each longitudinally extending from a first terminal end to a second terminal end and comprising an outer face and an inner face vertically extending between a first edge and a second edge, wherein the inner face of each of the first and second hem bar portions comprises a first channel located proximate to the first edge and a second channel located between the first and second edges;
- a pair of tubular splines each adapted to wedge and retain the shade material within the first channels of the first and second hem bar portions, wherein the shade material is adapted to wrap around the outer faces of the first and second hem bar portions; and a longitudinal retaining clip comprising at least a pair of oppositely disposed hooked arms outwardly extending therefrom, wherein each of the hooked arms is adapted to enter and clip to one of the third channels in a respective one of the first and second hem bar portions to attach the first hem bar portion to the second hem bar portion;

wherein the shade material is adapted to be retained between the first hem bar portion and the second hem bar portion.

* * * * *